United States Patent
Zhu et al.

(10) Patent No.: US 9,794,827 B2
(45) Date of Patent: *Oct. 17, 2017

(54) SYSTEM AND METHOD FOR FACILITATING INPUTTING OF COMMANDS TO A MOBILE DEVICE

(71) Applicant: SPOTIFY AB, Stockholm (SE)

(72) Inventors: Ranqi Zhu, New York, NY (US); Reid Wilbur, New York, NY (US); Minwei Gu, Boston, MA (US)

(73) Assignee: SPOTIFY AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/339,565

(22) Filed: Oct. 31, 2016

(65) Prior Publication Data

US 2017/0048750 A1   Feb. 16, 2017

Related U.S. Application Data

(63) Continuation of application No. 14/701,383, filed on Apr. 30, 2015, now Pat. No. 9,510,131.

(51) Int. Cl.
| | |
|---|---|
| *H04W 28/04* | (2009.01) |
| *H04W 4/00* | (2009.01) |
| *H04M 1/725* | (2006.01) |
| *H04B 1/10* | (2006.01) |
| *H04W 88/02* | (2009.01) |

(52) U.S. Cl.
CPC ........ *H04W 28/048* (2013.01); *H04B 1/1027* (2013.01); *H04M 1/72522* (2013.01); *H04M 1/72569* (2013.01); *H04W 4/003* (2013.01); *H04W 88/02* (2013.01)

(58) Field of Classification Search
CPC . H04W 4/003; H04W 88/02; H04M 1/72569; H04M 1/72522

See application file for complete search history.

(56) References Cited

U.S. PATENT DOCUMENTS

| | | | |
|---|---|---|---|
| 2005/0034079 A1* | 2/2005 | Gunasekar | G06F 17/289 715/753 |
| 2007/0176898 A1* | 8/2007 | Suh | G06F 1/1616 345/158 |
| 2010/0009643 A1* | 1/2010 | Haartsen | H04W 52/0251 455/127.5 |

* cited by examiner

*Primary Examiner* — Chuong A Ngo
(74) *Attorney, Agent, or Firm* — Tucker Ellis LLP

(57) ABSTRACT

The present disclosure relates to a method performed by a mobile device for facilitating inputting a command to a service application in the mobile device. The mobile device comprises an inertial measurement unit (IMU). The method comprises determining a time interval in which a user of the mobile device will agitate the mobile device in accordance with a command. The method also comprises filtering an information feed from the IMU during said time interval to remove signals which are outside of a predetermined spectrum and thus regarded as noise. The method comprises finding distinguishable signals within the filtered feed, said distinguishable signals forming a command pattern. The method comprises associating the command pattern with the command.

19 Claims, 1 Drawing Sheet

SYSTEM AND METHOD FOR FACILITATING INPUTTING OF COMMANDS TO A MOBILE DEVICE

CLAIM OF PRIORITY

This application is a continuation of U.S. patent application titled "SYSTEM AND METHOD FOR FACILITATING INPUTTING OF COMMANDS TO A MOBILE DEVICE" application Ser. No. 14/701,383, filed Apr. 30, 2015; which application is herein incorporated by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present disclosure relates to a method performed by a mobile device for facilitating inputting a command to a service application in the mobile device by agitating the mobile device.

BACKGROUND

A service may be provided by a service provider to a smartphone running a service application for the service. The user of the smartphone may thus activate the service application which in turn requests data from a server of the service provider, typically over the Internet, for providing the service to the user. Additionally or alternatively, the service application may provide the service offline, when the service data is already stored in the smartphone.

A user typically controls the service by inputting commands to the service application via button(s), touchscreen, microphone or other user interface of the smartphone. However, this may be difficult when e.g., out running or driving a car, since it implies that the user must take up the phone, look at it and possibly activate the user interface and/or service application. It would thus be convenient to simplify the input of a command to the service application.

SUMMARY

It is an objective of the present invention to facilitate inputting of a command to a service application in a mobile device by means of agitation of the mobile device.

According to an aspect of an embodiment of the present invention, there is provided a method performed by a mobile device for facilitating inputting a command to a service application in the mobile device. The service application may e.g., be for a service provided by a service provider over the Internet such as a service for streaming media. The mobile device comprises an inertial measurement unit (IMU). The method comprises determining a time interval in which a user of the mobile device will agitate (e.g., tap, shake, rotate or otherwise move) the mobile device in accordance with a command, e.g., a command the user would like to use for control of the service of the service application. The method also comprises filtering an information feed from the IMU during said time interval to remove signals which are outside of a predetermined spectrum and thus regarded as noise. The method also comprises finding distinguishable signals within the filtered feed, said distinguishable signals forming a command pattern. It is noted that although the feed has been filtered, there may still be background signals, which may be of a lower amplitude, allowing the signals forming the command pattern to be distinguishable there from. The method also comprises associating the command pattern with the command. Thereby, the command which the user wishes to be able to use is linked to the agitation he/she subjected the mobile device to during the time interval. The mobile device may thus be trained to interpret a type of agitation as a command input.

In some embodiments, the method further comprises, after the associating of the command pattern with the command, continuously filtering the feed from the IMU to remove signals which are outside of the predetermined spectrum. The method may also comprise identifying distinguishable signals within the continuously filtered feed which conform with the command pattern. The method may also comprise, in response to the identifying, presenting the command to the service application.

According to another aspect of an embodiment, there is provided a mobile device comprising an inertial measurement unit (IMU), a service application, processor circuitry, and a storage unit storing instructions executable by said processor circuitry whereby said mobile device is operative to determine a time interval in which a user of the mobile device will agitate the mobile device in accordance with a command to the service application. The mobile device is also operative to filter an information feed from the IMU during said time interval to remove signals which are outside of a predetermined spectrum and thus regarded as noise. The mobile device is also operative to find distinguishable signals within the filtered feed, said distinguishable signals forming a command pattern. The mobile device is also operative to associate the command pattern with the command.

In some embodiments, the mobile device of is further operative to, after the associating of the command pattern with the command, continuously filter the feed from the IMU to remove signals which are outside of the predetermined spectrum. The mobile device may also be operative to identify distinguishable signals within the continuously filtered feed which conform with the command pattern. The mobile device may also be operative to, in response to the identifying, present the command to the service application.

According to another aspect of an embodiment, there is provided a computer program product comprising computer-executable components for causing a mobile device to perform an embodiment of the method of the present disclosure when the computer-executable components are run on processor circuitry comprised in the mobile device.

According to another aspect of an embodiment, there is provided an application software for a mobile device comprising an inertial measurement unit (IMU). The software comprises computer program code which is able to, when run on processor circuitry of the mobile device, cause the mobile device to determine a time interval in which a user of the mobile device will agitate the mobile device in accordance with a command to a service application in the mobile device. The code is also able to cause the mobile device to filter an information feed from the IMU during said time interval to remove signals which are outside of a predetermined spectrum and thus regarded as noise. The code is also able to cause the mobile device to find distinguishable signals within the filtered feed, said distinguishable signals forming a command pattern. The code is also able to cause the mobile device to associate the command pattern with the command.

In some embodiments, the code is further able to cause the mobile device to, after the associating of the command pattern with the command, continuously filter the feed from the IMU to remove signals which are outside of the predetermined spectrum. The code may also be able to cause the mobile device to identify distinguishable signals within the continuously filtered feed which conform with the command pattern. The code may also be able to cause the mobile device to, in response to the identifying, present the command to the service application.

In some embodiments, the application software may be stored on a non-volatile computer readable medium to form a computer program product of the present disclosure.

It is an advantage of some embodiments that a user (a person) of the mobile device, e.g., a smartphone, can train the mobile device to interpret a specific agitation pattern, such as tapping, shaking, jumping with it or the like, as a command input, and not as general movement of the device when the user is carrying it around. Of course, the command pattern comprises some degrees of freedom such that it includes agitation which is similar to the agitation performed by the user when training the mobile device. For instance, a double tap may be defined to be within a double tap command pattern as long as the length of the time period between the two taps is within a predetermined time deviation from the length of the time period between the two taps when the user trained the device, and the taps are distinct enough to be interpreted as taps and not merely unspecific/inadvertent agitation of the device when carried by the user. Tapping may be performed directly or indirectly via an inelastic connection between the mobile device and a tapping body part (finger, knuckle or the like), e.g., tapping through a fabric such as of a pocket or gloves or by tapping a surface on (and in contact with) which the mobile device is positioned (e.g., a table top). Once the command pattern (e.g., for a double tap) has been formed, the command pattern can be associated with a command to the service application, e.g., "stop/play" or "next" command if the service application is for a streaming media service. An advantage is also that the user may choose him-/herself what type of agitation should be used for inputting which command by means of the training functionality provided by some embodiments. Then, the user may use the chosen agitation types for controlling the service application in the mobile device.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE FIGURES

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
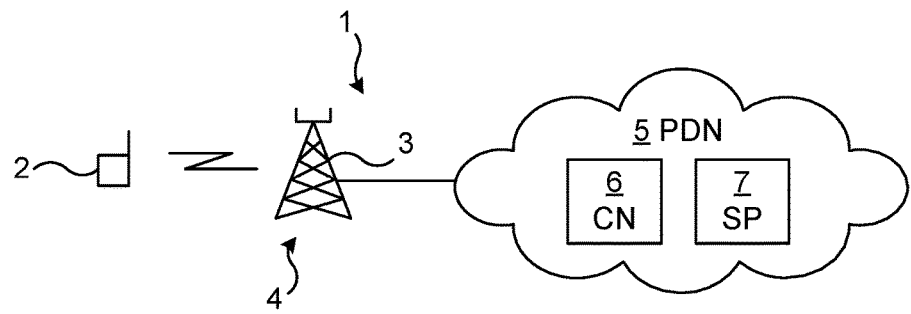
FIG. 1 is a schematic diagram illustrating an embodiment of a mobile device connected to a communication system.

FIG. 1 illustrates an embodiment of a mobile device 2, here a radio device in the form of a smartphone or a tablet computer, connected to a communication network 1. The communication network may be a Wireless Local Area Network (WLAN) or, as illustrated in the figure, a cellular network, e.g., in accordance with a Third Generation Partnership Project (3GPP) communication standard. The 3GPP network 1 comprises a plurality of base stations 3, e.g., Node B:s or evolved Node B:s (eNB), in a Radio Access Network (RAN) 4. Via the RAN 4, the mobile device 2 is connected with a Packet Data Network (PDN) such as the Internet as well as with a Core Network (CN) 6 of the communication network 1 and with a service provider (SP) 7, or rather one or more servers of said SP 7, for providing a service to the mobile device 2 running an application software (SW) for an application for the service. In different conventional network architectures the CN gives access to the PDN, or the CN is accessed via the PDN. It should be noted that the mobile device 2 does not have to be connected to a communication network 1 in order to beneficially use embodiments of the present invention. The service application of the radio device 2 may be of a type that does not need to be connected to a SP 7, or may be of a type that only needs to be connected to the SP 7 occasionally.

However, the mobile device 2 may conveniently be a radio device. The mobile radio device 2 may be any devices able to communicate over a radio interface, typical examples include a smartphone or a tablet, or any other mobile media player. The radio device 2 may use any radio communication standard to connect to a server of the service provider 7, e.g., a wireless local area network (WLAN) or a cellular network, typically in accordance with a 3GPP standard. In the figure, the radio device 1 has connectivity via a cellular radio communication network 1 comprising a RAN 4 and a CN 6 which provides access to a packet data network PDN 5, e.g., the Internet, via which the SP 7 is accessible.

Figure 2:
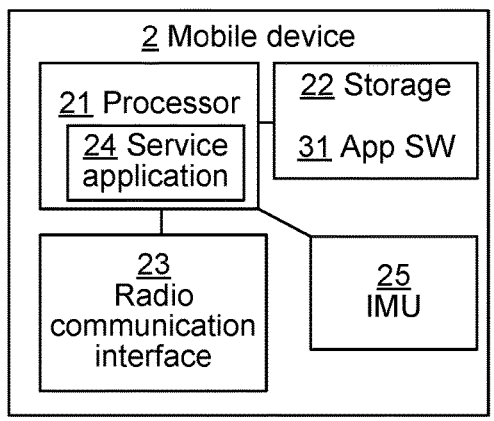
FIG. 2 is a schematic block diagram of an embodiment of a mobile device.

FIG. 2 schematically illustrates an embodiment of a mobile device 2 of the present disclosure. The mobile device 2 comprises processor circuitry 21 e.g., a central processing unit (CPU). The processor circuitry 21 may comprise one or a plurality of processing units in the form of microprocessor(s). However, other suitable devices with computing capabilities could be comprised in the processor circuitry 21, e.g., an application specific integrated circuit (ASIC), a field programmable gate array (FPGA) or a complex programmable logic device (CPLD). The processor circuitry 21 is configured to run one or several computer program(s) or software (SW) 31 (see also FIG. 3), e.g., an application software (app), stored in a storage 22 of one or several storage unit(s) e.g., a memory. When running the application SW 31, a service application 24 is functionally formed in the processor circuitry 21. The storage unit is regarded as a computer readable means 32 (see also FIG. 3) as discussed herein and may e.g., be in the form of a Random Access Memory (RAM), a Flash memory or other solid state memory, or a hard disk, or be a combination thereof. The processor circuitry 21 may also be configured to store data in the storage 22, as needed. The mobile device 2 may also comprise a communication interface 23, e.g., a radio interface having a radio transceiver for radio communication with, e.g., a server of the SP 7 via the RAN 4. The mobile device 2 also comprises an Inertial Measurement Unit (IMU) 25 for detecting movement of the mobile device. The IMU 25 may comprise a plurality of accelerometers and a gyroscope. The IMU 25, in the context of an embodiment, is configured for detecting the agitation which the user subjects the mobile device to in order to input a command (or train the mobile device to recognize the type of agitation as a command) to the service application 24. The IMU 25 may continuously be active and produce an information feed which can be processed by the processing circuitry 21, at least in the normal case or when not expressly turned off by the user or in an energy saving mode, or the IMU may be active and produce an information feed only when activated by the user or by an application 24.

Figure 3:
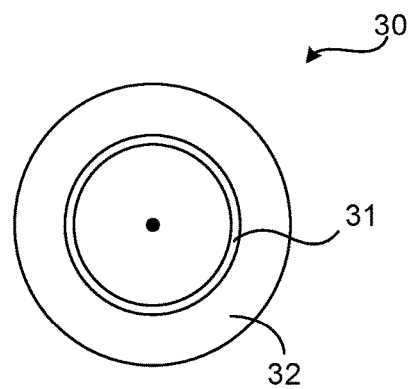
FIG. 3 is a schematic illustration of an embodiment of a computer program product.

FIG. 3 illustrates a computer program product 30 in accordance with an embodiment. The computer program product 30 comprises a computer readable (e.g., non-volatile) medium 32 comprising a computer program 31 in the form of computer-executable components. The computer program 31/computer-executable components may be configured to cause a processing device such as a mobile device 2, e.g., as discussed herein, to perform an embodiment of a method of the present disclosure. The computer program/computer-executable components may be run on the processor circuitry 21 of the device 2 for causing the device to perform the method. The computer program product 30 may e.g., be comprised in a storage unit or memory 22 comprised in the device 2 and associated with the processor circuitry 21. Alternatively, the computer program product 30 may be, or be part of, a separate, e.g., mobile, storage means, such as a computer readable disc, e.g., CD or DVD or hard disc/drive, or a solid state storage medium, e.g., a RAM or Flash memory.

Figure 4:
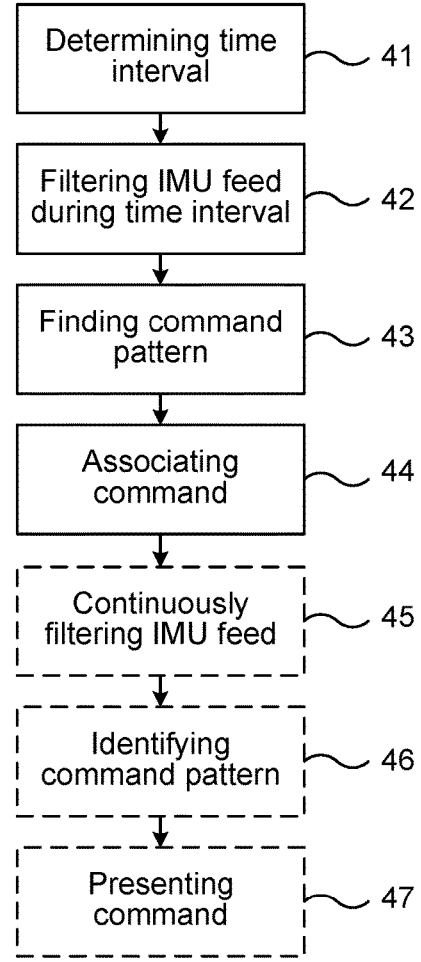
FIG. 4 is a schematic flow chart of some embodiments of a method.

FIG. 4 is a schematic flow chart of embodiments of the method, performed by the mobile device, e.g., at least partly by the service application 24 or by a separate helper application. The method may be controlled/implemented by the service application 25 or by a separate helper application in the mobile device.

In accordance with an embodiment, the mobile device 2 determines 41 a time interval in which a user of the mobile device will agitate the mobile device in accordance with a command. The time interval may e.g., be determined 41 by interaction with the user via a user interface, e.g., buttons or a touchscreen of the mobile device. The user may indicate via the user interface that he/she now intends to perform the agitation which he/she wants to use for inputting the command to the service application 24. Alternatively, an application (e.g., the service application 24 or a separate helper application) may run (automatically or prompted by the user) a training mode which includes a sequence comprising instructing the user to perform a type of agitation (tapping, shaking etc.) which he/she wishes to associate with a (possibly predefined) command to the service application.

Then, the mobile device 2 filters 42 the information feed from the IMU 25 during the time interval to remove signals which are outside of a predetermined spectrum and thus regarded as noise. For instance, the filtering 42 may comprise removing signals having a frequency below a predetermined frequency threshold e.g., by means of a high-pass filter. When a signal is transformed on time domain into frequency domain, it may be possible to pick a desired frequency. In this case, only frequencies above a certain threshold are desired. Low frequency movement in general, e.g., as determined by measured acceleration, could be imagined as movement oscillates/vibrates/gentle changes which are part of normal movements when carrying the mobile device, e.g., in a pocket, and not part of intentional agitation for a command by the user. This kind of filtering (high-pass, low-pass, etc.) is a common technique in signal processing in general and is not further elaborated on herein. Additionally or alternatively, the filtering 42 may comprise removing signals which the radio device 2 has been trained to regard as noise. The training mode sequence may e.g., comprise measuring movements detected by the IMU 25 when the mobile device is in regular use (when the user is not deliberately agitating the mobile device to input a command). The mobile device may for instance analyse the information feed from the IMU during a time period (e.g., a few hours) of regular use of the mobile device, for instance when the mobile device is carried around in a pocket or bag, or is used for surfing the Internet. Thus, the mobile device 2 may learn which signals of the information feed from the IMU 25 are likely to be related to regular use and not command agitation, and may remove those signals during the filtering 42. Regular or random movements that the mobile device is thus not trained to be part of command pattern, e.g., carrying the mobile device, dropping it, flipping it, and any of numerous other possibilities. In accordance with an embodiment, machine learning may be used to avoid hand tuning towards countless possibilities.

Within the filtered feed from the IMU 25, the mobile device 2 finds 43 distinguishable signals forming a command pattern. These distinguishable signals are signals resulting from the deliberate agitation by the user. The command pattern is conveniently defined in a suitably broad manner so as to cover a type of agitation rather than identical agitation since it may be difficult (if not impossible) for a user to reproduce the exact same agitation each time he/she wishes to input the command (e.g., when on the move and tapping the mobile device through fabric of a pocket). The distinguishable signals are distinct from the signals which have been filtered 42 from the feed (since they are still present in the filtered feed) and distinct from any remaining background signals in the filtered feed.

Then, the mobile device 2 associates 44 the command pattern with the command. The user may already from the start have instructed the mobile device that the agitation is for a certain command, or he/she may at a later stage choose to associate the resulting command pattern with the command. It may also be possible to, at a later stage disassociate the command pattern from the command and associate it with another command if desired.

Now that the command pattern has been associated with a command to the service application 24, the user is able to input the command to the service application by repeating the type of agitation which results in the command pattern. Of course, several different command patterns may be associated with different commands. For instance, in case the service application is for a streaming media service, one command pattern (i.e. one type of agitation) may be associated with the command "play/stop" while another command pattern (type of agitation) is associated with the command "next (song/video)" or any other command for controlling the media streaming of the service application. Thus, the method may optionally include using the type(s) of agitation in order to input the associated command(s).

In accordance with an embodiment, in a first optional step, the mobile device, after the associating 44 of the command pattern with the command, continuously filters 45 the feed from the IMU to remove signals which are outside of a predetermined spectrum (typically the same predetermined spectrum as during the training). Here, the mobile device continuously listens for any signals consistent with agitation which fits a command pattern associated with a command. The mobile device may listen like this always or only when that function is activated by the user. It may be a feature of the service application 24, or of a separate helper application.

In accordance with an embodiment, in a second optional step, the mobile device identifies 46 distinguishable signals within the continuously filtered feed which conform with a command pattern. The signals are thus such that the mobile device interprets them as resulting from agitation which the user intends for inputting a command.

In accordance with an embodiment, in a third optional step, the mobile device, in response to the identifying 46, presents 47 the command to the service application 24. Since the command pattern is associated with the specific command, the mobile device draws the conclusion that the user desires to input said command to the service application. If the method is implemented by a helper application, the helper application may present the command to the service application 24 which thus is instructed to comply with the command. If the method is implemented by the service application 24 itself, the presenting may be performed when it is determined that the command pattern is associated with said command and an executive part of the service application is instructed to comply with the command.

By means of the above presented method, a user may e.g., control a streaming media by e.g., tapping the mobile device when carried in a pocket (without the need to at all take the mobile device out of said pocket). In accordance with an embodiment, this may be made possible, as discussed above, at least in part by a machine learning algorithm e.g., using a Support Vector Machine (SVM) model or any other conventional such algorithm.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The present disclosure has mainly been described above with reference to a few embodiments. However, as is readily appreciated by a person skilled in the art, other embodiments than the ones disclosed above are equally possible within the scope of the present disclosure, as defined by the appended claims.

What is claimed is:

1. A method performed by a mobile device for facilitating inputting of a command to a service application of the mobile device, the mobile device comprising an inertial measurement unit (IMU), the method comprising:
training the mobile device to interpret agitations of the mobile device as command inputs, including, for each of one or more commands,
determining a time interval during which the mobile device is to be trained to associate an agitation of the mobile device with a command;
filtering an information feed from the inertial measurement unit during said time interval, to remove signals recognized as noise; and
determining distinguishable signals within the filtered information feed, said distinguishable signals forming a command pattern that is associated with the agitation and the command;
associating a plurality of types of agitation with a plurality of command patterns and commands, including associating each of the plurality of command patterns with a type of agitation, and
an associated command acceptable as an input to the service application;
determining, subsequent to training the mobile device, in response to a particular agitation of the mobile device, a particular command pattern associated with a particular command; and
in response thereto, providing the particular command as input to the service application.

2. The method of claim 1, further comprising:
after training the mobile device, continuously filtering the information feed from the inertial measurement unit, to remove signals recognized as noise;
determining distinguishable signals within the continuously filtered information feed which conform with a command pattern that is associated with a type of agitation and an associated command; and
in response to the identifying, presenting the associated command to the service application.

3. The method of claim 1, wherein the service application is an application for media streaming.

4. The method of claim 1, wherein the particular command is a command for controlling media streaming of the service application.

5. The method of claim 1, wherein the filtering comprises removing signals having a frequency below a predetermined frequency threshold.

6. The method of claim 1, wherein the filtering comprises removing signals which the mobile device has been trained to regard as noise.

7. The method of claim 1, wherein the method is implemented by the service application.

8. The method of claim 1, wherein the method is implemented by a helper application in the mobile device, separate from the service application.

9. The method of claim 1, wherein the particular command pattern corresponds to the user agitating the mobile device by tapping it.

10. The method of claim 1, wherein the step of finding signals comprises using a Support Vector Machine (SVM) model.

11. A mobile device comprising:
an inertial measurement unit (IMU);
a service application;
processor circuitry; and
a storage unit storing instructions executable by said processor circuitry whereby said mobile device is operative to:
    train the mobile device to interpret agitations of the mobile device as command inputs, including, for each of one or more commands,
        determine a time interval during which the mobile device is to be trained to associate an agitation of the mobile device with a command to the service application;
        filter an information feed from the inertial measurement unit during said time interval, to remove signals recognized as noise; and
        determine distinguishable signals within the filtered information feed, said distinguishable signals forming a command pattern that is associated with the agitation and the command;
    associate a plurality of types of agitation with a plurality of command patterns and commands, including associating each of the plurality of command patterns with
        a type of agitation, and
        an associated command acceptable as an input to the service application;
    determine, subsequent to training the mobile device, in response to a particular agitation of the mobile device, a particular command pattern associated with a particular command; and
    in response thereto, provide the particular command as input to the service application.

12. The mobile device of claim 11, further operative to:
after training the mobile device, continuously filter the information feed from the inertial measurement unit, to remove signals recognized as noise;
determine distinguishable signals within the continuously filtered information feed which conform with a command pattern that is associated with a type of agitation and an associated command; and
in response to the identifying, present the associated command to the service application.

13. The mobile device of claim 11, wherein the inertial measurement unit comprises accelerometers and a gyroscope.

14. The mobile device of claim 11, wherein the mobile device is a radio device.

15. The mobile device of claim 14, wherein the radio device is a smartphone.

16. A non-transitory computer readable storage medium, including an application software for a mobile device comprising an inertial measurement unit (IMU), the software comprising computer program code which is able to, when run on processor circuitry of the mobile device, cause the mobile device to:
train the mobile device to interpret agitations of the mobile device as command inputs, including, for each of one or more commands,
    determine a time interval during which the mobile device is to be trained to associate an agitation of the mobile device with a command to a service application in the mobile device;
    filter an information feed from the inertial measurement unit during said time interval, to remove signals recognized as noise; and
    determine distinguishable signals within the filtered information feed, said distinguishable signals forming a command pattern that is associated with the agitation and the command;
associate a plurality of types of agitation with a plurality of command patterns and commands, including associating each of the plurality of command patterns with
    a type of agitation, and
    an associated command acceptable as an input to the service application;
determine, subsequent to training the mobile device, in response to a particular agitation of the mobile device, a particular command pattern associated with a particular command; and
in response thereto, provide the particular command as input to the service application.

17. The non-transitory computer readable storage medium including the application software of claim 16, wherein the code is also able to cause the mobile device to:
after training the mobile device, continuously filter the information feed from the inertial measurement unit, to remove signals recognized as noise;
determine distinguishable signals within the continuously filtered information feed which conform with a command pattern that is associated with a type of agitation and an associated command; and
in response to the identifying, present the associated command to the service application.

18. The non-transitory computer readable storage medium including the application software of claim 16, wherein the application software is comprised in the service application.

19. The non-transitory computer readable storage medium including the application software of claim 16, wherein the application software is comprised in a helper application in the mobile device.

* * * * *